US010875397B2

(12) United States Patent
Wilhide (10) Patent No.: US 10,875,397 B2
(45) Date of Patent: Dec. 29, 2020

(54) HESM FAST RECHARGE ALGORITHM

(71) Applicant: Hamilton Sundstrand Corporation, Charlotte, NC (US)

(72) Inventor: Matthew L. Wilhide, Cherry Valley, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 411 days.

(21) Appl. No.: 15/639,209

(22) Filed: Jun. 30, 2017

(65) Prior Publication Data

US 2019/0001804 A1 Jan. 3, 2019

(51) Int. Cl.

| H02J 7/00 | (2006.01) |
|---|---|
| B60K 6/28 | (2007.10) |
| B60K 6/44 | (2007.10) |
| B60K 6/00 | (2006.01) |
| B60W 10/26 | (2006.01) |
| H01M 10/0525 | (2010.01) |
| H01M 10/34 | (2006.01) |
| H01M 10/30 | (2006.01) |

(52) U.S. Cl.
CPC ............... B60K 6/28 (2013.01); B60K 6/00 (2013.01); B60K 6/44 (2013.01); B60W 10/26 (2013.01); B60W 2510/244 (2013.01); B60Y 2400/114 (2013.01); H01M 10/0525 (2013.01); H01M 10/30 (2013.01); H01M 10/345 (2013.01); H01M 2220/20 (2013.01)

(58) Field of Classification Search
CPC ........................................................ B60K 6/28

USPC ....................................................... 320/110
See application file for complete search history.

(56) References Cited

U.S. PATENT DOCUMENTS

| 6,998,822 B2 | 2/2006 | Turner |
| 7,701,082 B2 | 4/2010 | Lazarovich |
| 7,830,686 B2 | 11/2010 | Zeng |
| 8,890,463 B2 | 11/2014 | Rozman |
| 8,981,727 B2 | 3/2015 | Kusch et al. |
| 9,013,066 B2 | 4/2015 | Kojori |
| 9,197,088 B2 | 11/2015 | Viellard |
| 9,230,748 B1 | 1/2016 | Semrau |
| 9,238,415 B2 | 1/2016 | King et al. |
| 9,419,522 B1 | 8/2016 | Khaligh |
| 9,535,480 B2 | 1/2017 | Ye et al. |

(Continued)

OTHER PUBLICATIONS

Wilhide, U.S. Appl. No. 15/230,181, filed Aug. 5, 2016 and entitled "Hybrid Energy Storage Module Arrangements".

(Continued)

*Primary Examiner* — Arun C Williams
(74) *Attorney, Agent, or Firm* — Snell & Wilmer L.L.P.

(57) ABSTRACT

A hybrid energy storage module (HESM) configured to be used on an aircraft to provide electrical energy may include a battery and an ultracapacitor each configured to receive the electrical energy, store the electrical energy, and discharge the electrical energy, a power bus in electronic communication with the battery and the ultracapacitor, and a controller coupled to the battery and the ultracapacitor and configured to control charging and discharging of the battery and of the ultracapacitor such that a measured voltage of the power bus is adjusted based upon at least one of a battery state of charge (SOC) or an ultracapacitor SOC.

18 Claims, 4 Drawing Sheets

(56) References Cited

U.S. PATENT DOCUMENTS

| | | |
|---|---|---|
| 10,315,522 B2 | 6/2019 | Hikiri |
| 2005/0052165 A1* | 3/2005 | Willner .............. H02J 7/0063 323/266 |
| 2007/0182362 A1 | 8/2007 | Trainor |
| 2009/0309416 A1* | 12/2009 | Bose .................. B60K 6/32 307/9.1 |
| 2010/0131137 A1* | 5/2010 | Iida .................. G01R 31/396 701/22 |
| 2011/0011659 A1 | 1/2011 | Sailor |
| 2013/0200846 A1* | 8/2013 | Ang .................. B60L 58/20 320/109 |
| 2014/0339902 A1 | 11/2014 | Sepe, Jr. |
| 2016/0082844 A1 | 3/2016 | King et al. |
| 2016/0204654 A1 | 7/2016 | Mondal |
| 2016/0214737 A1 | 7/2016 | Radun et al. |
| 2016/0265469 A1 | 9/2016 | Harada |
| 2016/0288663 A1 | 10/2016 | Hikiri |
| 2016/0318418 A1* | 11/2016 | Tokushige .......... H01M 10/615 |
| 2016/0378085 A1 | 12/2016 | Guo |
| 2017/0057363 A1 | 3/2017 | Huh |
| 2017/0063124 A1 | 3/2017 | Yu et al. |
| 2017/0077739 A1 | 3/2017 | Jouper |
| 2017/0155266 A1 | 6/2017 | Namou |
| 2017/0166081 A1 | 6/2017 | Kwon |

OTHER PUBLICATIONS

Wilhide, U.S. Appl. No. 15/639,104, filed Jun. 30, 2017 and entitled "HESM High Pluse Power Algorithm".

Wilhide, U.S. Appl. No. 15/639,128, filed Jun. 30, 2017 and entitled "HESM Parallel Response Mode".

Heglund, et al., U.S. Appl. No. 15/638,986, filed Jun. 30, 2017 and entitled "Hybrid Energy Storage Modules for Directed Energy Systems".

USPTO, Notice of Allowance dated Jan. 31, 2020 in U.S. Appl. No. 15/638,986.

USPTO, Pre-Interview First Office Action dated Aug. 21, 2019 in U.S. Appl. No. 15/639,104.

USPTO, Non Office Action dated Sep. 26, 2019 in U.S. Appl. No. 15/638,986.

USPTO, Notice of Allowance dated Sep. 24, 2019 in U.S. Appl. No. 15/639,128.

USPTO, First Action Interview Office Action dated Oct. 31, 2019 in U.S. Appl. No. 15/639,104.

Wikipedia contributors. (Apr. 14, 2019). Slew rate. In Wikipedia, The Free Encyclopedia. Retrieved 20:52, Sep. 18, 2019, from https://en.wikipedia.org/w/index.php?title=Slew_rate&oldid=892432254 (Year 2019).

USPTO, Advisory Action dated Jul. 23, 2020 in U.S. Appl. No. 15/639,104.

USPTO, Notice of Allowance dated Sep. 3, 2020 in U.S. Appl. No. 15/639,104.

* cited by examiner

HESM FAST RECHARGE ALGORITHM

FIELD

The present disclosure is directed to power management systems for charging and discharging batteries and ultracapacitors of a hybrid energy storage module of an aircraft.

BACKGROUND

Many new components are being developed for use with aircraft. Some of these components may operate based on electrical energy. The electrical energy may be generated by a generator that converts mechanical power from an engine of the aircraft into electrical energy. The amplitude of the electrical energy required for some of these components may be relatively large. In that regard, it may be undesirable for the total electrical energy to be provided by the generator. This is because generation of the requisite electrical energy may undesirably affect performance of the engine.

SUMMARY

A hybrid energy storage module (HESM) configured to be used on an aircraft to provide electrical energy is disclosed herein, in accordance with various embodiments. The HESM may include a battery and an ultracapacitor each configured to receive the electrical energy, store the electrical energy, and discharge the electrical energy, a power bus in electronic communication with the battery and the ultracapacitor, and a controller coupled to the battery and the ultracapacitor and configured to control charging and discharging of the battery and of the ultracapacitor such that a measured voltage of the power bus is adjusted based upon at least one of a battery state of charge (SOC) and an ultracapacitor SOC.

In various embodiments, the measured voltage of the power bus may be adjusted in response to at least one of the battery SOC and the ultracapacitor SOC being less than a SOC threshold value. The controller may include a command trim, a voltage regulator, and an energy storage unit (ESU) current allocator. The command trim may include a minimum value function configured to determine a minimum value of the battery SOC and the ultracapacitor SOC, and a true/false function configured to determine if the minimum value is greater than the SOC threshold value. The controller may calculate a voltage adjust command based upon the minimum value. The controller may calculate a voltage adjust command based upon a current error in response to the minimum value being greater than the SOC threshold value. The controller may further include a multiplier configured to multiply the current error with a disable signal, wherein the disable signal comprises one (1) in response to the minimum value being greater than the SOC threshold value, and comprises zero (0) in response to the minimum value being less than the SOC threshold value. The controller may further include a summing block configured to receive the minimum value and subtract the SOC threshold value from the minimum value to generate a SOC error. The controller may further include a SOC error limit function configured to limit the SOC error to a limited SOC error. The HESM may further comprise a first converter coupled between the ultracapacitor and the power bus, and a second converter coupled between the battery and the power bus. The ESU current allocator may send a first converter command signal to the first converter and a second converter command signal to the second converter.

A controller for use with a hybrid energy storage module (HESM) that is configured for use with an aircraft and includes a battery and an ultracapacitor is disclosed herein in accordance with various embodiments. The controller may comprise a command trim, a voltage regulator, and an energy storage unit (ESU) current allocator, wherein the command trim generates a voltage adjust command based upon at least one of a battery state of charge (SOC) and an ultracapacitor SOC. The command trim may generate the voltage adjust command based upon an energy storage unit (ESU) command.

The controller may be configured to measure a voltage of a power bus and adjust the voltage based upon the voltage adjust command. The command trim may include a minimum value function configured to determine a minimum value of the battery SOC and the ultracapacitor SOC, and a true/false function configured to determine if the minimum value is greater than the SOC threshold value. The controller may calculate the voltage adjust command based upon the minimum value. The voltage adjust command may be sent to the voltage regulator. The voltage regulator may generate an ESU current command based upon the voltage adjust command and the ESU current command is received by the command trim.

A method for controlling a hybrid energy storage module (HESM) is disclosed herein, in accordance with various embodiments. The method may comprise receiving, by a controller, a battery state of charge (SOC) and an ultracapacitor SOC, determining, by the controller, if at least one of the battery SOC and the ultracapacitor SOC is above a SOC threshold value, and calculating, by the controller, a voltage adjust command, in response to the battery SOC or the ultracapacitor SOC being below the SOC threshold value.

In various embodiments, the method may further comprise receiving, by the controller, an energy storage unit (ESU) current command, and determining, by the controller, if the ESU current command is equal to zero.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

A hybrid energy storage module (HESM) of the present disclosure may reduce the duration of time it takes to recharge an energy storage unit (ESU). A HESM of the present disclosure includes an algorithm referred to herein as a command trim. The command trim may increase the amount of power being supplied to the ESU in response to a state of charge (SOC) of the ESU being below a threshold value.

Figure 1:
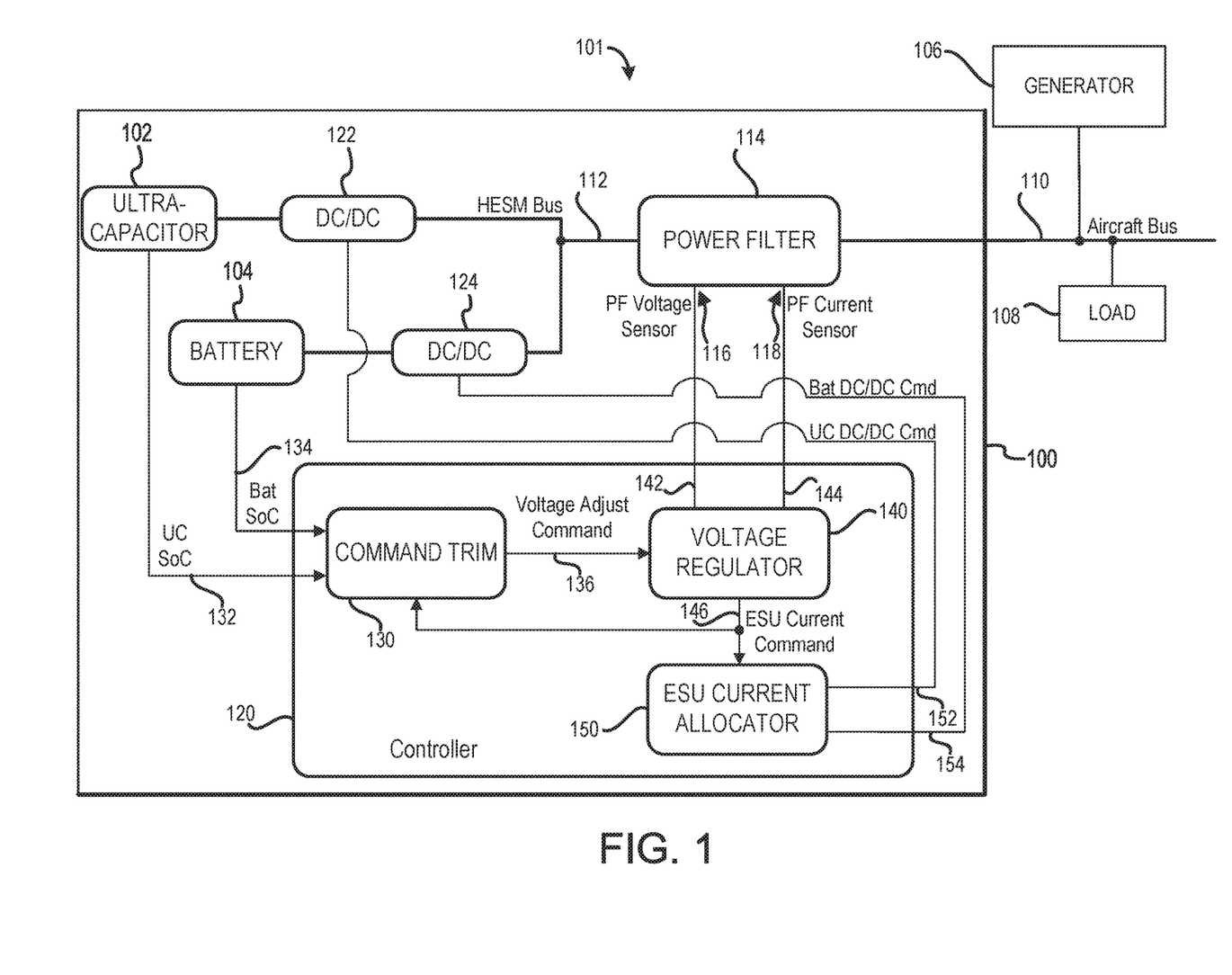
FIG. 1 is a block diagram illustrating features of a power management system of an aircraft, in accordance with various embodiments of the present disclosure.

FIG. 1 illustrates a power management system 101 for use with an aircraft. The power management system 101 includes a HESM 100, a generator 106, and a load 108. The load 108 may include any load that operates using electrical energy.

The generator 106 may be coupled to an engine of the aircraft, such as a gas turbine engine, and may convert mechanical power from the engine into electrical energy.

The HESM 100 may be designed to receive, store, and discharge electrical energy. In that regard, the HESM 100 includes an ultracapacitor 102, a battery 104, and a controller 120. The ultracapacitor 102 may also be referred to as a supercapacitor or an electric double-layer capacitor and may use one or both of electrostatic double-layer capacitance or electrochemical pseudocapacitance to store an electrical charge. A charge level of the ultracapacitor 102 may be referred to as an ultracapacitor SOC. The ultracapacitor 102 may store less charge than a battery and may store more charge than an electrolytic or other capacitor. The ultracapacitor 102 may be referred to herein as an ESU.

The battery 104 may include any battery capable of storing an electrical charge. For example, the battery 104 may include a lithium-ion battery, a nickel cadmium battery, a nickel metal hydride battery, a lead acid battery, or the like. A charge level of the battery 104 may be referred to as a battery SOC. The battery 104 may be referred to herein as an ESU.

In response to the load 108 drawing electrical energy, the electrical energy may be provided simultaneously from the HESM 100 and from the generator 106. The load 108 may draw power in a series of pulses. For example, the load 108 may draw and utilize power for a first duration ("on" cycle), such as 8 seconds, may cease drawing the power for a second duration ("off" cycle), such as 2 seconds, may again draw the power for the first duration, and so forth. The first duration and the second duration may be determined based upon the design of load 108.

The ultracapacitor 102 may store less total electrical energy than the battery 104 and may also be capable of withstanding more charge/discharge cycles than the battery 104 without affecting performance of the ultracapacitor 102 over its lifetime. In that regard, it may be desirable for the ultracapacitor 102 to be recharged after each "on" cycle of the load 108 (i.e., during the "off" cycle), and it may be desirable for the battery 104 to be recharged after multiple cycles of the load 108.

In that regard, the controller 120 may control the charging and the discharging of the ultracapacitor 102 and the battery 104 such that the ultracapacitor 102 and the battery 104 discharge simultaneously to power the load 108, and the ultracapacitor 102 recharges prior to recharging of the battery 104.

The controller 120 may receive information from a power bus 110 that links the load 108, the generator 106, and the HESM 100. For example, the information may include a request for an amount of current, a request for an amount of voltage, a voltage on the power bus 110, or the like. Based on this information, the HESM 100 may generate an internal current command signal corresponding to an amount of current to be output by the HESM 100 or to an amount of current that will be provided to the HESM 100 to charge the ultracapacitor 102 and the battery 104. In this regard, ultracapacitor 102 and battery 104 may be coupled to a HESM bus 112. Ultracapacitor 102 and battery 104 may be coupled in parallel with each other. Ultracapacitor 102 and battery 103 may be coupled in series with HESM bus 112 and power bus 110.

Although depicted as a single ultracapacitor 102, it is contemplated herein that ultracapacitor 102 may comprise a plurality of ultracapacitors. The plurality of ultracapacitors may be connected in parallel. Although depicted as a single battery 104, it is contemplated herein that battery 104 may comprise a plurality of batteries. The plurality of batteries may be connected in parallel. In this regard, HESM 100 may comprise a plurality of channels corresponding to various ultracapacitors and/or batteries.

System 101 may comprise a power filter 114. Power filter 114 may be coupled between power bus 110 and HESM bus 112. Power filter 114 may be coupled in series between power bus 110 and HESM bus 112. In this regard, power filter 114 may be in electronic communication with power bus 110 and HESM bus 112. Power filter 114 may filter the power signal between converter 122 and power bus 110 and/or between converter 122 and power bus 110. Power filter 114 may filter switching noise generated by converter 122 and/or converter 124. Stated differently, power filter 114 may filter a power signal between HESM bus 112 and power bus 110. Power filter 114 may include a voltage sensor 116 and a current sensor 118. Voltage sensor 116 may measure an electrical voltage of power bus 110. Current sensor 118 may measure an electrical current through power bus 110. In this regard, controller 120 may receive a voltage signal 142 and a current signal 144 from power filter 114. Voltage signal 142 and a current signal 144 may correspond to the voltage and the current of power bus 110, respectively. In various embodiments, the voltage of power bus 110 and HESM bus 112 may be substantially equal.

In various embodiments, system 101 may comprise a converter (also referred to herein as a first converter) 122.

Converter 122 may be coupled between HESM bus 112 and ultracapacitor 102. Converter 122 may convert a relatively lower input voltage, from ultracapacitor 102 for example, to a relatively higher output voltage, to HESM bus 112 for example. Converter 122 may convert a relatively higher input voltage, from HESM bus 112 for example, to a relatively lower output voltage, to ultracapacitor 102 for example. System 101 may comprise a converter (also referred to herein as a second converter) 124. Converter 124 may be coupled between HESM bus 112 and battery 104. Converter 124 may convert a relatively lower input voltage, from battery 104 for example, to a relatively higher output voltage, to HESM bus 112 for example. Converter 124 may convert a relatively higher input voltage, from HESM bus 112 for example, to a relatively lower output voltage, to battery 104 for example. In this regard, the converters (i.e., converter 122 and converter 124) may step-up the voltage from the energy storage units to the HESM bus 112 and may step-down the voltage from HESM bus 112 to the energy storage units.

Although illustrated herein as comprising DC/DC converters, it is contemplated that converter 122 and converter 124 may comprise any type of converter suitable for load 108. Thus, in various embodiments, converter 122 and converter 124 may comprise DC/DC converters. In various embodiments, converter 122 and converter 124 may comprise DC/AC inverters.

The controller 120 may include various components or modules for controlling charge and discharge of the ultracapacitor 102 and the battery 104. Controller 120 may monitor the SOC of ultracapacitor 103 and the SOC of battery 104 and may command converter 122 and/or converter 124 to direct electrical energy into ultracapacitor 103 and/or battery 104 in response to the SOC of ultracapacitor 103 and/or battery 104 falling below a threshold value. Furthermore, in response to the SOC of ultracapacitor 103 and battery 104 being above the threshold value, controller may output a current command of zero (0) to converter 122 and converter 124 to prevent electrical energy from discharging from or being absorbed by ultracapacitor 103 and battery 104. Still further, in response to a load demand from power bus 110, controller 120 may command converter 122 and/or converter 124 to direct electrical energy from ultracapacitor 103 and/or battery 104 to power bus 110.

Controller 120 may include a command trim 130, a voltage regulator 140, and an ESU current allocator 150. Controller 120 may receive an ultracapacitor SOC signal 132 and a battery SOC signal 134. Ultracapacitor SOC signal 132 may indicate the amount of charge stored in ultracapacitor 102. Battery SOC signal 134 may indicate the amount of charge stored in battery 104. Command trim 130 may receive ultracapacitor SOC signal 132 and a battery SOC signal 134. Command trim 130 may receive a current command 146 from voltage regulator 140. Command trim 130 may send a voltage adjust command 136 based upon ultracapacitor SOC signal 132 and a battery SOC signal 134, and/or current command 146, as described with further detail herein. Voltage regulator 140 may receive voltage adjust command 136 and send current command 146 based upon voltage adjust command 136 and voltage signal 142. ESU current allocator 150 may receive current command 146 and send a converter command signal 152 and a converter command signal 154 to converter 122 and converter 124, respectively. Converter command signal 152 and converter command signal 154 may correspond to an amount of power to be received or sent by ultracapacitor 102 and battery 104, respectively.

In various embodiments, the natural state of controller 120 may be to output a current command (i.e., converter command signal 152 and a converter command signal 154) of zero (0) to converter 122 and converter 124. Stated differently, controller 120 may be configured to output a current command of zero (0) to converter 122 and converter 124 unless otherwise instructed in response to an external demand, such as a SOC of ultracapacitor 103 and/or battery 104 falling below a threshold value and/or a load demand from power bus 110. In various embodiments, controller 120 may drive the current command to zero (0) at a slower rate than the external demands. Thus, an external demand may override the natural state of the controller.

Figure 2:
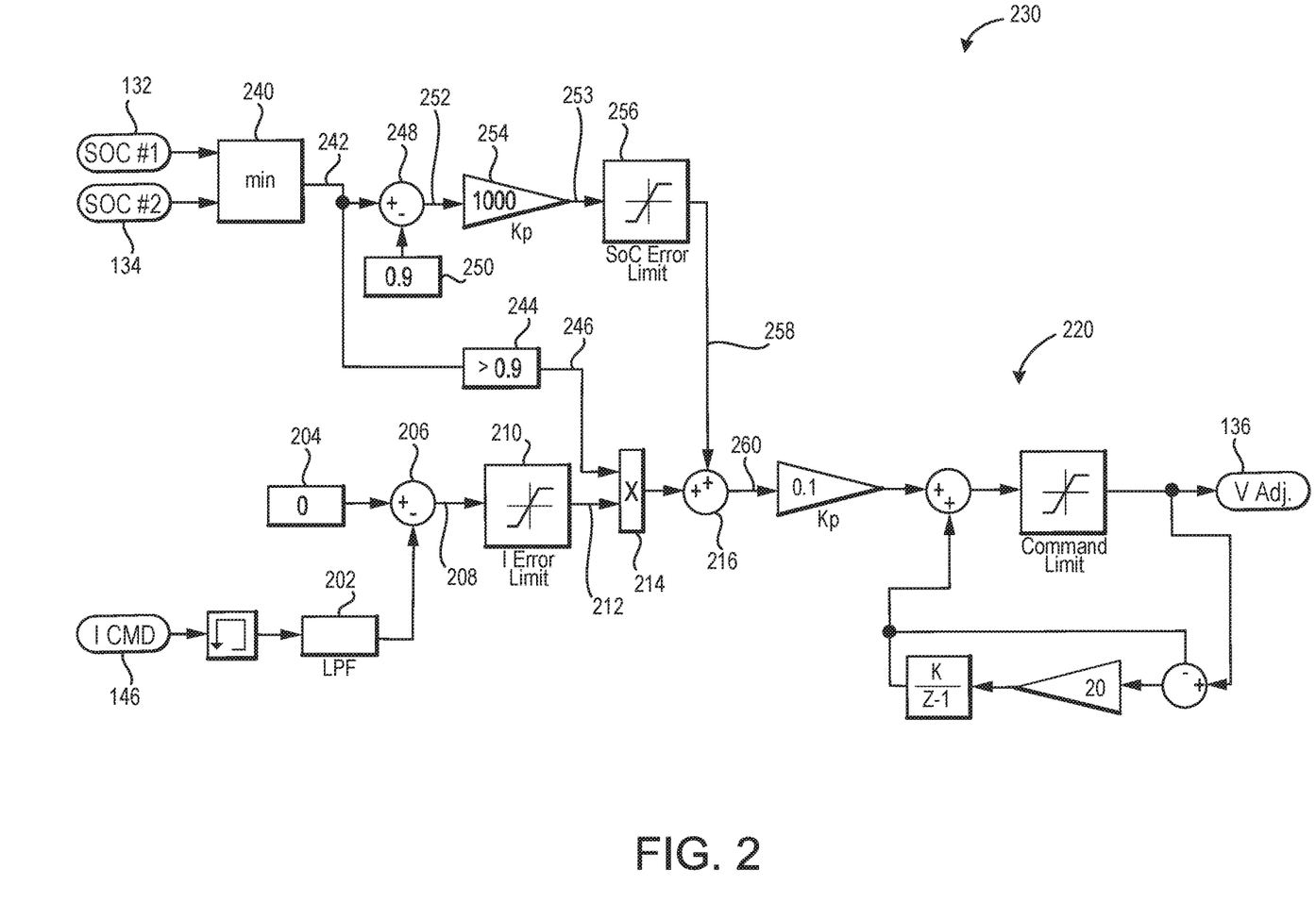
FIG. 2 is a block diagram illustrating features of a command trim of a power management system of an aircraft, in accordance with various embodiments of the present disclosure.

With reference to FIG. 2, a block diagram of a command trim 230 is illustrated, in accordance with various embodiments. In various embodiments, command trim 130 (with brief reference to FIG. 1) may be similar to command trim 230. Command trim 230 may receive current command 146. In various embodiments, a low pass filter (LPF) 202 may filter ESU current command 146. A summing block 206 may subtract the current command from a reference value 204. In various embodiments, reference value 204 may be zero (0). Reference value 204 may correspond to a natural state of command trim 230. Summing block 206 may output a current error 208. The current error 208 may be received by a current error limit function 210. The current error limit function 210 may compare the current error 208 to a maximum current error rate, and may output a limited current error 212 that is less than or equal to the maximum current error rate.

A multiplier 214 may receive the limited current error 212. Multiplier 214 may also receive a disable signal 246. Disable signal 246 may be generated based upon ultracapacitor SOC signal 132 and battery SOC signal 134. A minimum value function 240 may determine the minimum value of ultracapacitor SOC signal 132 and battery SOC signal 134 (also referred to herein as minimum value) 242. True/false function 244 may receive minimum value 242 and determine if minimum value 242 is greater than the SOC threshold value. However, the threshold value may be any suitable value between 0 and 0.99. In this regard, the threshold value may correspond to a percentage of the charge of ultracapacitor 102 and/or battery 104 relative to a full charge. For example, a threshold value of 0.9 may correspond to 90% charge. Disable signal 246 may be true (i.e., comprise a value of one (1)) when the minimum value 242 is greater than the threshold value. Disable signal 246 may be false (i.e., comprise a value of zero (0)) when the minimum value is not greater than the threshold value. In this regard, in response to minimum value 242 being less than or equal to the threshold value, disable signal 246 may comprise a value of zero and therefore the product, or output, of multiplier 214, would be zero (0), thereby disabling the portion of command trim 130 which takes into account current command 146. In response to minimum value 242 being greater than the threshold value, disable signal 246 may comprise a value of one (1) and therefore the product, or output, of multiplier 214, would be limited current error 212.

Summing block 248 may receive minimum value 242 and may subtract a SOC threshold value 250, such as 90% for example, from minimum value 242. In this regard, SOC error 252 may be a difference between the SOC threshold value 250 and minimum value 242. Thus, summing block 248 may output SOC error 252. Gain function 254 may receive SOC error 252 and may multiply SOC error 252 by a pre-determined value, such as 1000 for example. The adjusted SOC error 253 may be received by a SOC error limit function 256. The SOC error limit function 256 may compare the adjusted SOC error 253 to a maximum current error rate, and may output a limited SOC error 258 that is less than or equal to the maximum current error rate.

Summing block 216 may receive limited SOC error 258. Summing block 216 may receive the output from multiplier 214 (i.e., either zero (0) or limited current error 212). Summing block 216 may add together the limited SOC error 258 and the output from multiplier 214. Summing block 216 may output command error 260. Command error 260 may comprise limited SOC error 258 in response to minimum value 242 being less than or equal to the SOC threshold value. Command error 260 may comprise the sum of limited SOC error 258 and limited current error 212 in response to minimum value 242 being greater than or equal to the SOC threshold value. A proportional integral (PI) control 220 may receive command error 260 and output voltage adjust command 136.

Figure 3:
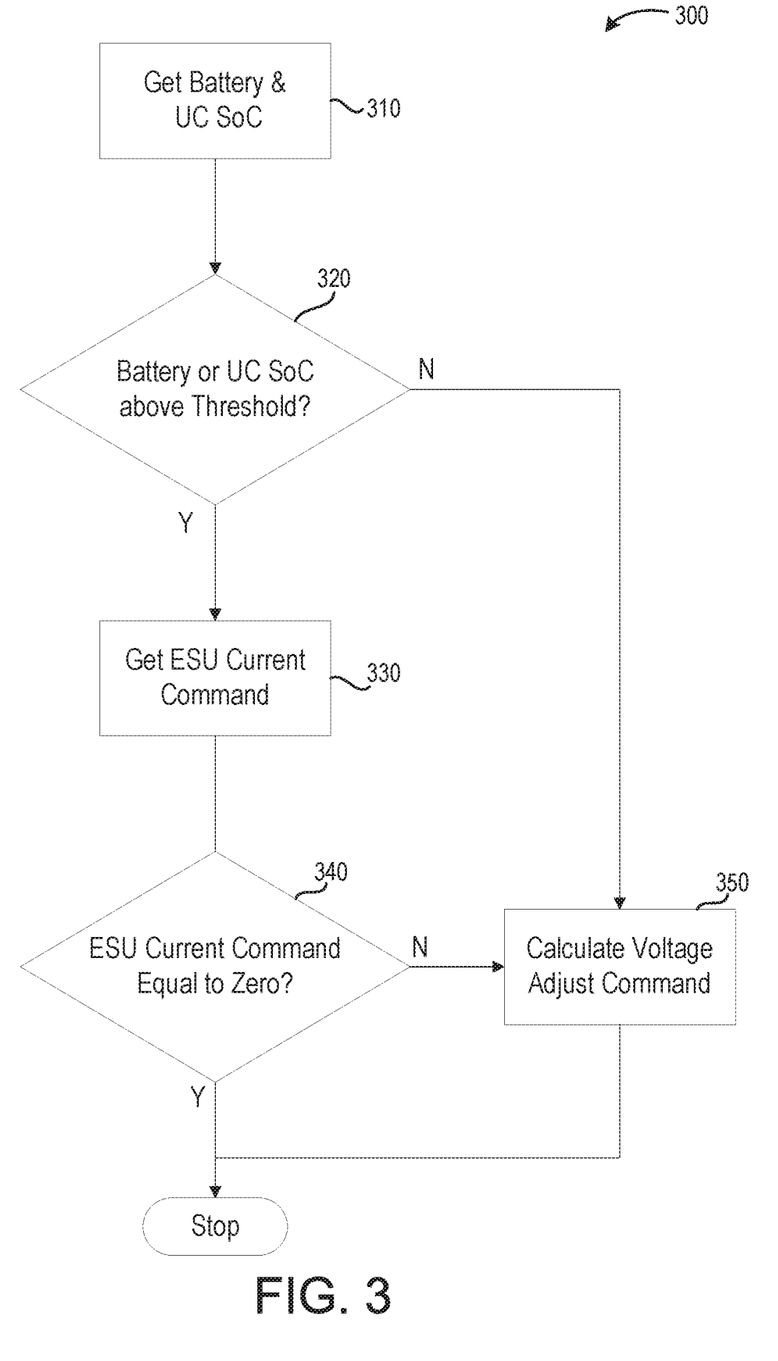
FIG. 3 is a schematic view of a command trim of a controller of the power management system of FIG. 1, in accordance with various embodiments of the present disclosure.

With reference to FIG. 3, a method 300 for controlling a HESM is illustrated, in accordance with various embodiments. Method 300 may include receiving a battery SOC and an ultracapacitor SOC (step 310). Method 300 may include determining if the battery SOC and/or the ultracapacitor SOC are below a threshold value (step 320). Method 300 may include receiving an ESU current command (step 330). Method 300 may include determining if the ESU current command is equal to zero (step 340). Method 300 may include calculating a voltage adjust command (step 350).

With combined reference to FIG. 1, FIG. 2, and FIG. 3, step 310 may include receiving, by command trim 130, ultracapacitor SOC signal 132 and battery SOC signal 134. Step 320 may include determining if ultracapacitor SOC signal 132 and/or battery SOC signal 134 is below the SOC threshold value. Step 330 may include receiving, by command trim 130, ESU current command 146. Step 330 may be performed in response to ultracapacitor SOC signal 132 and/or battery SOC signal 134 being greater than the SOC threshold value. Step 340 may include determining, by command trim 130, if ESU current command 146 is equal to zero. Step 350 may include calculating, by command trim 130, voltage adjust command 136. Step 350 may be performed in response to ultracapacitor SOC signal 132 and/or battery SOC signal 134 being less than or equal to the SOC threshold value. Step 350 may be performed in response to ESU current command being a non-zero value.

Referring to FIG. 1 and FIG. 2, each component or function of the controller 120 may be implemented using hardware or software. For example, the controller 120 may include a central processing unit (CPU), an accelerated processing unit (APU), a digital signal processor (DSP), a field programmable gate array (FPGA), an application specific integrated circuit (ASIC) or the like, and each component or function may be performed using software. In various embodiments, each component or function of the controller 120 may be performed by one or more separate piece of hardware. In various embodiments, multiple components or functions may be performed by a single piece of hardware.

Figure 4:
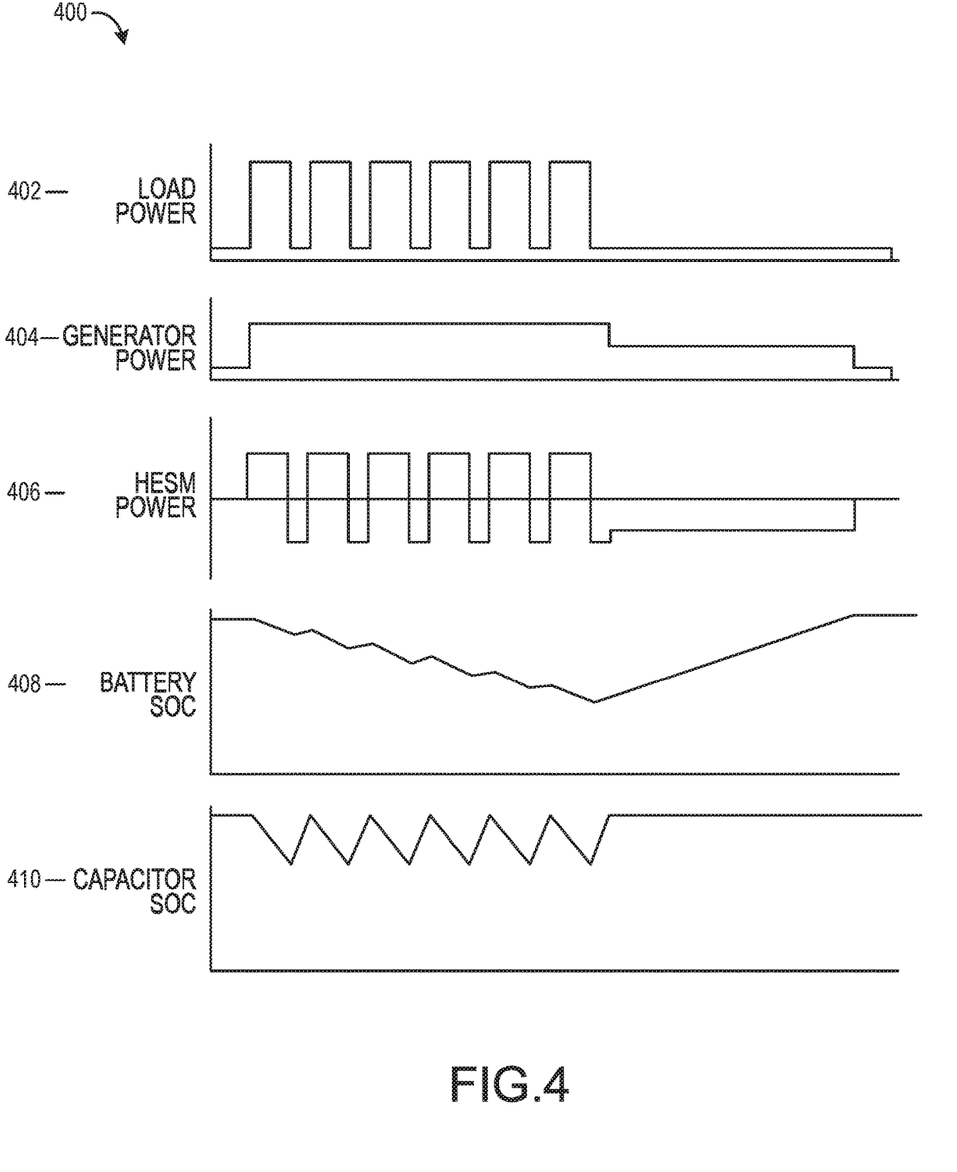
FIG. 4 is a graph illustrating power distribution of the power management system of FIG. 1, in accordance with various embodiments of the present disclosure.

Referring to FIGS. 1 and 4, a chart 400 illustrates exemplary operation of the system 101. The load power 402 may correspond to power usage by the load 108. As shown, the load power 402 includes a series of pulses which may correspond to an "on" cycle during which the load 108 uses power, and an "off" cycle during which the load 108 uses substantially no power.

As the power is initially requested for the load 108, the HESM 100 may begin to output electrical energy, as shown by HESM power 406. Simultaneously, the generator 106 may begin to output electrical energy, as shown by the generator power 404. In response to the load 108 receiving power, the electrical energy generated by both of the HESM 100 and by the generator 106 may be provided to the load 108. In particular, electrical energy may be discharged from the ultracapacitor 102 and from the battery 104, as shown in the capacitor SOC 410 and the battery SOC 408, respectively.

As the load power 402 reaches the "off" cycle, the generator 106 may continue to generate power. Because the ultracapacitor 102 has less energy storage capacity than the battery 104, the SOC of the ultracapacitor 102 may be lower than the SOC of the battery 104. Accordingly, a majority of the energy generated by the generator 106 may be provided to the ultracapacitor 102 to recharge the ultracapacitor 102. The battery 104 may not receive any electrical energy, or may receive minimal electrical energy, until the ultracapacitor 102 is charged to the desired ultracapacitor SOC, which may not happen during the load power series.

As the load power reaches another "on" cycle, power may again be provided to the load 108 from a combination of the generator 106, the ultracapacitor 102, and the battery 104. Because the battery 104 may receive minimal charge during the "off" cycle, the battery SOC 408 may continue to reduce during each "on" cycle without being recharged to a previous SOC. This charging structure may be desirable as the battery 104 may become damaged in response to fewer charge/discharge cycles than the ultracapacitor 102.

After the load power series is complete, the generator 106 may continue to generate energy to recharge the ultracapacitor 102 and the battery 104. As shown, the capacitor SOC 410 is charged to the desired ultracapacitor SOC prior to energy being provided to the battery 104 to charge the battery 104. In response to the capacitor SOC 410 reaching the desired ultracapacitor SOC, the energy generated by the generator 106 may be provided to the battery 104 to increase the battery SOC 408 to a desired battery SOC. In response to the battery SOC 408 reaching the desired battery SOC, the generator 106 may stop outputting energy, or may output a reduced energy level.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hybrid energy storage module (HESM) configured to be used on an aircraft to provide electrical energy, the HESM comprising:
    a battery and an ultracapacitor each configured to receive the electrical energy, store the electrical energy, and discharge the electrical energy;
    a power bus in electronic communication with the battery and the ultracapacitor; and
    a controller coupled to the battery and the ultracapacitor and configured to control charging and discharging of the battery and of the ultracapacitor such that a measured voltage of the power bus is adjusted based upon at least one of a battery state of charge (SOC) or an ultracapacitor SOC,
    wherein the HESM is configured to supply electric energy to a load exhibiting a load power comprising a series of pulses comprising a series of ON and OFF cycles,
    the battery and the ultracapacitor supply the electric energy during an ON cycle of the load power, wherein the ultracapacitor SOC is reduced below a desired ultracapacitor SOC during the ON cycle,
    the ultracapacitor is charged to the desired ultracapacitor SOC during an OFF cycle of the load power, and
    the controller comprises:
        a command trim configured to:
            receive a battery state of charge (SOC), an ultracapacitor SOC, and an energy storage unit (ESU) current command;
            calculate a voltage adjust command based upon at least one of the battery SOC, the ultracapacitor SOC, and the ESU current command; and
            send the voltage adjust command;
        a voltage regulator configured to:
            receive the voltage adjust command from the command trim; and
            send the ESU current command; and
        an energy storage unit (ESU) current allocator configured to:
            receive the ESU current command;
            send a first converter command signal to a first converter for controlling at least one of charging and discharging of the battery; and
            send a second converter command signal to a second converter for controlling at least one of charging and discharging of the ultracapacitor.

2. The HESM of claim 1, wherein the measured voltage of the power bus is adjusted in response to at least one of the battery SOC or the ultracapacitor SOC being less than a SOC threshold value.

3. The HESM of claim 2, wherein the command trim includes:
    a minimum value function configured to determine a minimum value of the battery SOC and the ultracapacitor SOC; and
    a true/false function configured to determine if the minimum value is greater than the SOC threshold value.

4. The HESM of claim 3, wherein the controller calculates the voltage adjust command based upon the minimum value.

5. The HESM of claim 3, wherein the controller calculates the voltage adjust command based upon a current error in response to the minimum value being greater than the SOC threshold value.

6. The HESM of claim 5, wherein the controller further includes a multiplier configured to multiply the current error with a disable signal, wherein the disable signal comprises one (1) in response to the minimum value being greater than the SOC threshold value, and comprises zero (0) in response to the minimum value being less than the SOC threshold value.

7. The HESM of claim 3, wherein the controller further includes a summing block configured to receive the minimum value and subtract the SOC threshold value from the minimum value to generate a SOC error.

8. The HESM of claim 7, wherein the controller further includes a SOC error limit function configured to limit the SOC error to a limited SOC error.

9. The HESM of claim 8, further comprising:
    the first converter coupled between the ultracapacitor and the power bus; and
    the second converter coupled between the battery and the power bus.

10. A controller for use with a hybrid energy storage module (HESM) that is configured for use with an aircraft and includes a battery and an ultracapacitor, the controller comprising:
    a command trim configured to:
        receive a battery state of charge (SOC), an ultracapacitor SOC, and an energy storage unit (ESU) current command; and
        calculate a voltage adjust command based upon at least one of the battery SOC, the ultracapacitor SOC, and the ESU current command; and
        send the voltage adjust command;
    a voltage regulator configured to:
        receive the voltage adjust command from the command trim; and
        send the ESU current command; and an energy storage unit (ESU) current allocator configured to:
receive the ESU current command;
send a first converter command signal to a first converter for controlling at least one of charging and discharging of the battery; and
send a second converter command signal to a second converter for controlling at least one of charging and discharging of the ultracapacitor;
wherein the HESM is configured to supply electric energy to a load exhibiting a load power comprising a series of pulses comprising a series of ON and OFF cycles,
the battery and the ultracapacitor supply the electric energy during an ON cycle of the load power, wherein the ultracapacitor SOC is reduced below a desired ultracapacitor SOC during the ON cycle, and
the ultracapacitor is charged to the desired ultracapacitor SOC during an OFF cycle of the load power.

11. The controller of claim 10, wherein the controller is configured to measure a voltage of a power bus and adjust the voltage based upon the voltage adjust command.

12. The controller of claim 11, wherein the command trim includes:
a minimum value function configured to determine a minimum value of the battery SOC and the ultracapacitor SOC; and
a true/false function configured to determine if the minimum value is greater than the SOC threshold value.

13. The controller of claim 12, wherein the controller calculates the voltage adjust command based upon the minimum value.

14. The controller of claim 13, wherein the voltage adjust command is sent to the voltage regulator.

15. The controller of claim 14, wherein the voltage regulator generates the ESU current command based upon the voltage adjust command.

16. A method for controlling a hybrid energy storage module (HESM), comprising:
receiving, by a controller, a battery state of charge (SOC) and an ultracapacitor SOC;
determining, by the controller, if at least one of the battery SOC or the ultracapacitor SOC is above a SOC threshold value;
calculating, by the controller, a voltage adjust command, in response to the battery SOC or the ultracapacitor SOC being below the SOC threshold value;
receiving, by the controller, an energy storage unit (ESU) current command;
determining, by the controller, if the ESU current command is equal to zero; and
calculating, by the controller, a second voltage adjust command, in response to the current command not equaling zero;
wherein the HESM is configured to supply electric energy to a load exhibiting a load power comprising a series of pulses comprising a series of ON and OFF cycles,
the battery and the ultracapacitor supply the electric energy during an ON cycle of the load power, wherein the ultracapacitor SOC is reduced below a desired ultracapacitor SOC during the ON cycle, and
the ultracapacitor is charged to the desired ultracapacitor SOC during an OFF cycle of the load power.

17. The HESM of claim 1, wherein the command trim calculates the voltage adjust command based upon the ESU current command in response to a minimum value of the battery SOC and the ultracapacitor SOC being greater than or equal to a SOC threshold value.

18. The HESM of claim 17, wherein the command trim calculates the voltage adjust command irrespective of the ESU current command in response to the minimum value of the battery SOC and the ultracapacitor SOC being less than the SOC threshold value.

* * * * *